(12) United States Patent
Aoki

(10) Patent No.: US 9,661,672 B2
(45) Date of Patent: May 23, 2017

(54) COMMUNICATION DEVICE, CONTROL METHOD, AND STORAGE MEDIUM

(71) Applicant: CANON KABUSHIKI KAISHA, Tokyo (JP)

(72) Inventor: Hitoshi Aoki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 14/626,099

(22) Filed: Feb. 19, 2015

(65) Prior Publication Data

US 2015/0245400 A1    Aug. 27, 2015

(30) Foreign Application Priority Data

Feb. 26, 2014  (JP) ................................. 2014-035997

(51) Int. Cl.
H04W 76/02        (2009.01)

(52) U.S. Cl.
CPC ....... H04W 76/023 (2013.01); H04W 76/022 (2013.01)

(58) Field of Classification Search
CPC .................................................. H04W 76/023
See application file for complete search history.

(56) References Cited

U.S. PATENT DOCUMENTS

| 2009/0231995 | A1* | 9/2009 | Chu | H04W 74/0841 370/225 |
|---|---|---|---|---|
| 2011/0090821 | A1* | 4/2011 | Seok | H04W 76/025 370/255 |
| 2012/0155350 | A1* | 6/2012 | Wentink | H04W 8/005 370/311 |
| 2012/0250576 | A1* | 10/2012 | Rajamani | H04W 8/005 370/254 |
| 2012/0265913 | A1* | 10/2012 | Suumaki | H04W 4/008 710/303 |
| 2013/0051353 | A1* | 2/2013 | Kim | H04W 16/14 370/329 |
| 2013/0265907 | A1* | 10/2013 | Kim | H04W 88/06 370/254 |
| 2013/0329693 | A1* | 12/2013 | Lee | H04W 16/14 370/329 |
| 2015/0181633 | A1* | 6/2015 | Kim | H04W 76/023 370/329 |

\* cited by examiner

*Primary Examiner* — Jason Mattis
(74) *Attorney, Agent, or Firm* — Carter, DeLuca, Farrell & Schmidt, LLP

(57) ABSTRACT

A communication device has a first function for forming a network, a second function for joining a network formed by a first other communication device, and a third function for communicating with a second other communication device that has joined the network formed by the first other communication device, through a direct connection based on the network formed by the first other communication device, when the communication device has joined, using the second function, the network formed by the first other communication device, and controls the third function so as to restrict processing for the direct connection using the third function, when the network has been formed by the first function.

9 Claims, 8 Drawing Sheets

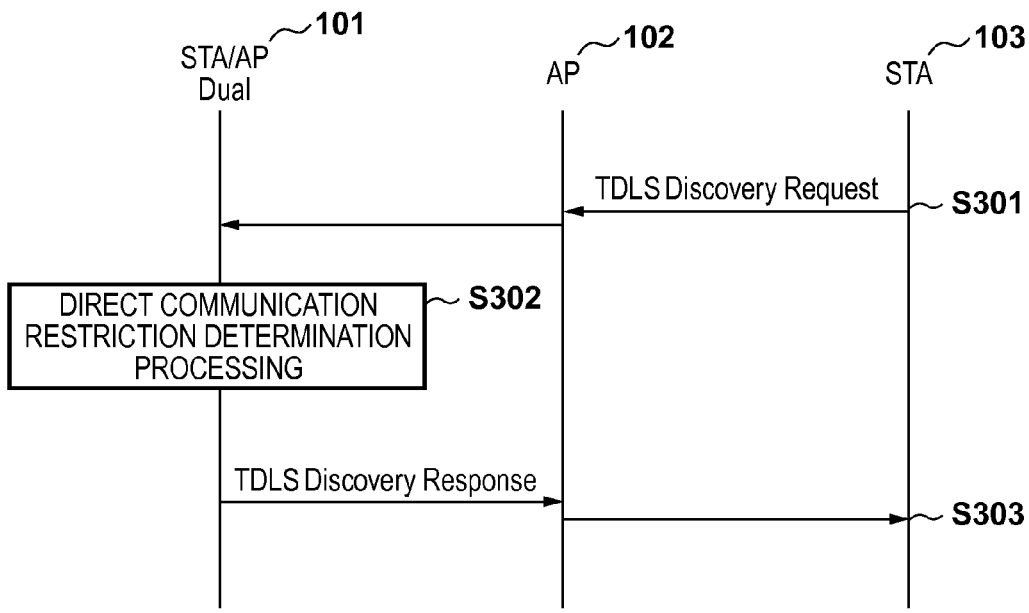
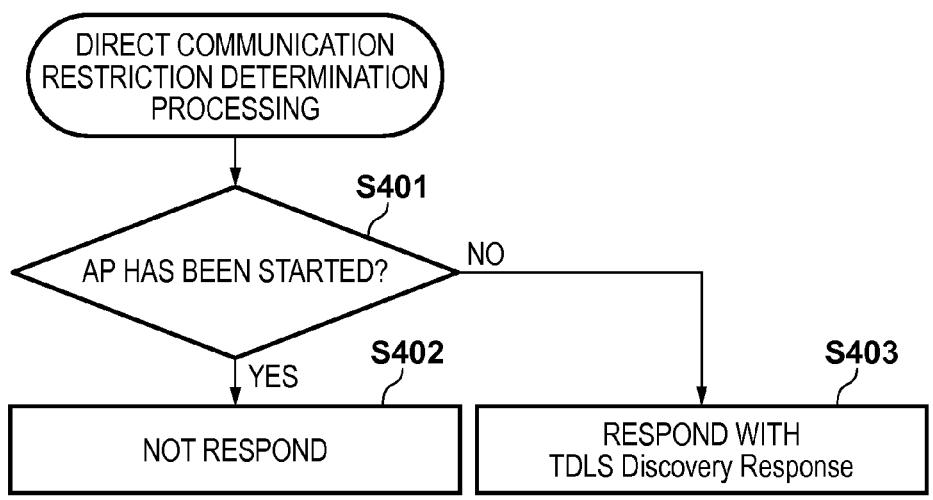

COMMUNICATION DEVICE, CONTROL METHOD, AND STORAGE MEDIUM

BACKGROUND OF THE INVENTION

Field of the Invention

The present invention relates to a connection control technique in wireless communication.

Description of the Related Art

Wireless LAN communication systems, which are represented by IEEE802.11 standard series, are widely used. With a wireless LAN, a base station called an access point (hereinafter, an AP) and a station (hereinafter, a STA) that exists within an area within which a radio wave of the AP can reach and that is in a wirelessly connected state establish a connection, establish a network, and wirelessly communicate with each other. In recent years, wireless communication devices having functions of the aforementioned access point and station have emerged. This kind of wireless communication device can form a network by serving as an access point by itself and establish connections to other terminals, while being connected, as a terminal, to a network formed by another access point.

Methods have emerged for performing communication not only with a simple wireless network configuration using conventional APs and STAs, but also in various modes of wireless LAN network. For example, Tunneled Direct Link Setup (TDLS) is a technique for communication between STAs that are connected to an AP, using a direct connection (direct link). IEEE Std 802.11-2012 describes a technique of establishing a direct connection between wireless STAs by transmitting and receiving control data for setting TDLS via an AP between wireless LAN terminals. Since each wireless LAN terminal directly communicates with a partner terminal by establishing a direct connection, communication can be performed that is not constrained due to the capability of the AP.

With TDLS, a channel for direct communication between STAs is not fixed to a channel (hereinafter referred to as a "base channel") of a wireless network configured by the AP and can be switched to another channel (hereinafter referred to as an "off-channel"). As a result, for example, even when the AP operates with a 2.4-GHz band, a STA can directly communicate with a partner STA by using a 5-GHz band channel.

In the present situation, when a direct connection by means of TDLS is established, a consideration is not given to the influence thereof on other connections that have been established at this time point. That is to say, for example, examination has not been conducted regarding the problem in the case where, when a wireless communication device has established a connection to another STA by serving as an AP while being connected to another AP by serving as a STA, the wireless communication device further establishes a direct connection by means of TDLS with still another STA.

The present invention has been made in view of the aforementioned problem, and provides a technique for controlling, in a communication device, a direct connection to another communication device, based on a state of other connections.

SUMMARY OF THE INVENTION

According to an aspect of the present invention, there is provided a communication device comprising: a communication unit including a first function for forming a network, a second function for joining a network formed by a first other communication device, and a third function for communicating with a second other communication device that has joined the network formed by the first other communication device, through a direct connection based on the network formed by the first other communication device, when the communication device has joined, using the second function, the network formed by the first other communication device; and a control unit configured to control the third function so as to restrict processing for the direct connection using the third function, when the network has been formed by the first function.

According to one aspect of the present invention, there is provided a communication device comprising: a communication unit including a first function for forming a network, a second function for joining a network formed by a first other communication device, and a third function for communicating with a second other communication device that has joined the network formed by the first other communication device, through a direct connection based on the network formed by the first other communication device, when the communication device has joined, using the second function, the network formed by the first other communication device; and a control unit configured to control, while the direct connection has been established by the third function, the communication unit so as to restrict establishment of another connection using the first function or the third function.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a sequence chart showing a first example of a processing flow in Embodiment 1.

FIG. 4 is a flowchart showing a first example of direct communication restriction determination processing in Embodiment 1.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that a description will be given below of the case where a wireless LAN conforming to IEEE802.11 standard series is used. However, the following embodiments describe examples, and the present invention is not limited thereto and is also applicable in the case where other similar systems are used. That is to say, the following discussion is applicable to a system in which there is a possibility that, while a communication device has established a connection to another communication device, the communication device establishes a direct connection to still another communication device.

Note that the communication devices (STAs) described below use Tunneled Direct Link Setup (TDLS) in order to establish a direct connection. That is to say, when the communication device has joined a network formed by a first other communication device (AP), the communication device establishes a direct connection to a second other communication device that has joined this network, by using the network formed by the first other communication device. It is also assumed that at least one communication device can simultaneously establish other connections while maintaining a connection to another AP, by forming a network using an AP function or by establishing a direct connection to a third other communication device, for example.

Exemplary Configuration of Wireless Communication System

Figure 1:
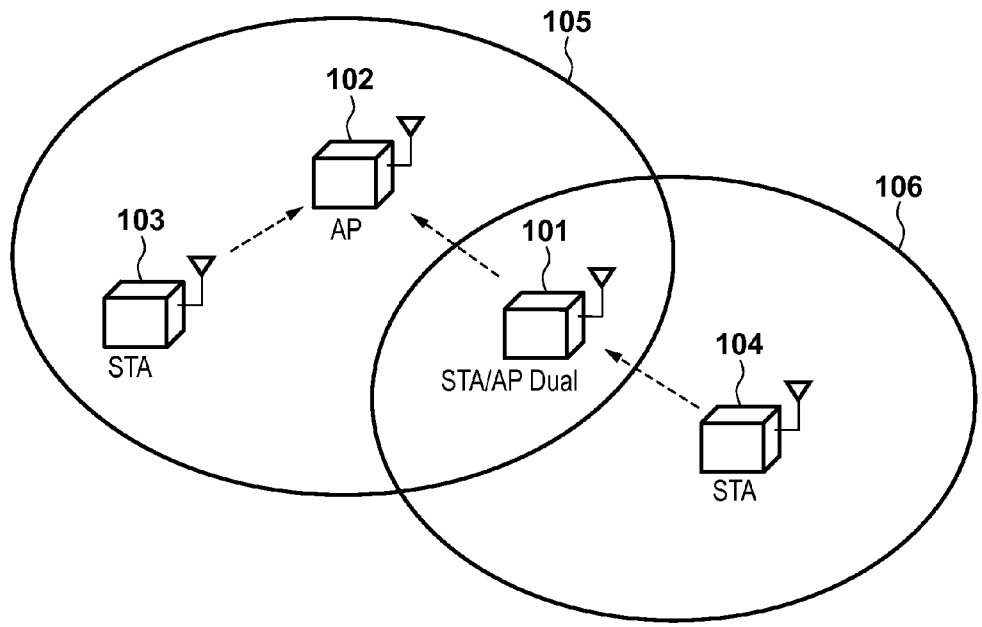
FIG. 1 is a diagram showing an exemplary configuration of a wireless communication system.

An exemplary configuration of a wireless communication system in the embodiments described below is shown in FIG. 1. A STA/AP Dual 101 (hereinafter referred to as an "STA/AP 101") is a communication device for a wireless LAN conforming to IEEE802.11 standard series. The STA/AP 101 has a base station (access point, AP) function and a terminal (STA) function for a wireless LAN, and can form a network by serving as an AP and communicate with other STAs, while joining, by serving as a STA, a network that is formed by another AP. More specifically, for example, in Embodiment 1 below, the STA/AP 101 forms a wireless network 106 by serving as an AP and communicates with a STA 104, while joining, by serving as a STA, a wireless network 105 formed by an AP 102.

Note that the STA/AP 101 does not have to use the wireless LAN AP function. For example, a description will be given of the case where, in a situation where the STA/AP 101 has established, via the AP 102, a direct connection to a STA 103, the STA 104 further gives the STA/AP 101 a request to establish a direct connection (via an AP (not shown)) in an example of Embodiment 2 below. Note that Embodiment 2 will also describe the case where the STA/AP 101 uses the AP function. That is to say, the STA/AP 101 is a communication device that has at least a terminal function, and does not have to have a base station function, depending on the case.

The AP 102 is a base station (AP) of a wireless LAN that forms the wireless network 105. The STA 103 is a STA that has joined the wireless network 105. The wireless network 105 is a wireless network formed by the AP 102, and STAs, namely the STA/AP 101 and the STA 103 have joined the wireless network 105 in the example in FIG. 1. In an example, the wireless network 106 is a wireless network formed by the STA/AP 101. In an example, the STA 104 joins the wireless network 106 and performs communication by using the STA/AP 101 as an AP. Here, for example, the wireless network 105 and the wireless network 106 perform communication by using the same radio channel.

Functional Configuration of STA/AP 101

Figure 2:
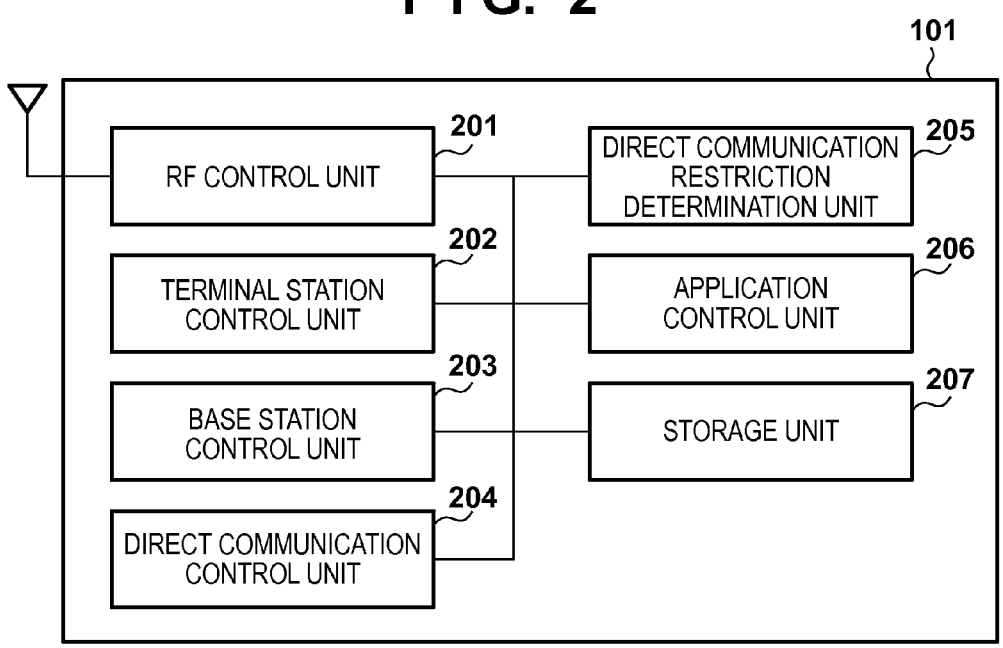
FIG. 2 is a block diagram showing an exemplary functional configuration of a STA/AP 101.

FIG. 2 is a block diagram showing an exemplary functional configuration of the STA/AP 101 according to the following embodiments. The STA/AP 101 has an RF control unit 201, a terminal station control unit 202, a base station control unit 203, a direct communication control unit 204, a direct communication restriction determination unit 205, an application control unit 206, and a storage unit 207, for example.

The RF control unit 201 is configured to include an antenna for transmitting or receiving a wireless signal from/to other wireless LAN communication devices, a circuit, and a program for controlling them. The terminal station control unit 202 is configured to include hardware and a program for controlling the RF control unit 201 such that the STA/AP 101 functions as a STA (terminal) in a wireless LAN, for example. The terminal station control unit 202 performs control such that the STA/AP 101 joins the wireless network 105 by serving as a terminal, and communicates with the AP 102. The base station control unit 203 is configured to include hardware and a program for controlling the RF control unit 201 such that the STA/AP 101 functions as an AP (base station) in a wireless LAN, for example. The base station control unit 203 performs control for forming the wireless network 106 by the STA/AP 101 serving as a base station, and communicating with a terminal (STA 104) that joins this wireless network 106. Note that the STA/AP 101 does not have to have the base station control unit 203, depending on the case.

The direct communication control unit 204 is configured to include hardware and a program for controlling the RF control unit 201 such that the STA/AP 101 directly communicates with the STA 103 without via the AP 102 after establishing, via the AP 102, a direct connection to the STA 103, for example. The direct communication restriction determination unit 205 is configured to include a program for determining whether to establish a direct connection when a request to establish a direct connection is given from the STA 103 via the AP 102, or for determining setting control related to a direct connection, for example. The specific control of the direct communication restriction determination unit 205 will be described later.

The application control unit 206 is configured to include software and hardware for controlling an application that operates on the STA/AP 101, for example. The STA/AP 101 communicates with communication devices in other wireless LANs in accordance with an instruction of the application control unit 206. The storage unit 207 is constituted by a ROM and a RAM for saving a program and data by which the STA/AP 101 operates, for example.

Outline

Prior to the description of the embodiments of the present invention, an outline of the technique will be described. First, in order to smooth the description of the following embodiments, an example will be described of possible influence of a direct connection between a first STA (e.g., STA/AP 101) and a second STA (e.g., STA 103) on other connections.

For example, the case will be examined where the STA/AP 101 forms the wireless network 106 by serving as an AP, while joining the wireless network 105 by serving as a STA, using the terminal station control unit 202 and the base station control unit 203. In this case, if the STA/AP 101 establishes a direct connection in accordance with arrival of a request from the STA 103, three connections are simultaneously established, and the control for the communication in these connections becomes very complicated in some cases. As a result, there are cases where the stability of the communication cannot be maintained. Furthermore, if switching of a channel in a direct connection occurs after the direct connection is established, there is a possibility that the STA/AP 101 loses a packet from the STA 104 that has joined the wireless network 106 formed by the STA/AP 101.

Also assume that, when the STA/AP 101 has established a direct connection to the STA 103 based on the wireless network 105 formed by the AP 102, using the terminal station control unit 202, for example, the STA 104 gives a request to establish a direct connection (e.g., via another AP). In this case, if the STA/AP 101 establishes a direct connection in accordance with this request, a plurality of direct connections are simultaneously established, and consequently there are cases where the communication control in the STA/AP 101 becomes very complicated. In this case, in particular, there are cases where the number of connections of the STA/AP 101 increases due to a connection to the AP 102 by serving as a STA, a direct connection to the STA 103, a direct connection to the STA 104, a connection to the AP of the wireless network that the STA 104 has joined by serving as a STA, and the like, for example. For this reason, it is important to perform control for restricting connections in such a situation.

Attention will be paid to this point in the following embodiments, and for example, when the STA/AP 101 has formed a wireless network by serving as an AP, the STA/AP 101 restricts its operation of the function related to the direct connection so as not to establish a direct connection, or so as not to switch the channel. It is thereby possible to prevent establishment of a new direct connection or a change of the channel in an already-established direct connection, for example. In another embodiment, for example, when a direct connection has been established and another connection is about to be newly established, the STA/AP 101 disconnects the established direct connection or restricts establishment of the other connection. That is to say, for example, when the STA/AP 101 is to form a wireless network by serving as an AP while a direct connection to the STA 103 has been established, the STA/AP 101 forms the wireless network by serving as an AP after disconnecting the direct connection to the STA 103. Alternatively, for example, while a direct connection has been established to the STA 103, the STA/AP 101 does not form the wireless network 106 by using the AP function, or does not establish a direct connection to the STA 104. The number of connections that are simultaneously established by the STA/AP 101 is thereby restricted, and accordingly the stability of communication processing can be improved.

In the following embodiments, flows of the above processing executed by the STA/AP 101 shown in FIG. 2 will be described in detail.

Embodiment 1

In the present embodiment, the STA/AP 101 can join, by serving as a STA, the wireless network 105 formed by the AP 102, and meanwhile, the STA/AP 101 can form the wireless network 106 by serving as an AP and establish a connection to the STA 104. Here, when the STA/AP 101 establishes a direct connection to the STA 103 that has similarly joined the wireless network 105, or when a request to change the channel is given from the STA 103 to which the STA/AP 101 has already established a direct connection, the STA/AP 101 restricts the operation related to the direct connection. Hereinafter, some examples of the specific processing flow will be described.

Processing Example 1

FIG. 3 shows a first example of a processing flow in the present embodiment. In this example, the STA/AP 101 receives a TDLS Discovery Request from the STA 103 via the AP 102. A TDLS Discovery Request is a frame that is defined in the IEEE802.11 standard and is transmitted in order to find other STAs with which direct communication can be performed.

Initially, the STA 103 broadcasts a discovery request (TDLS Discovery Request) for searching for STAs with which direct communication can be performed. The AP 102, upon receiving this TDLS Discovery Request, broadcasts the received signal. Thereafter, the TDLS Discovery Request transmitted by the AP 102 is received by the STA/AP 101 (S301). The STA/AP 101, upon receiving the TDLS Discovery Request, executes direct communication restriction determination processing for determining whether the STA/AP 101 is in a state of being able to establish a direct connection (S302).

FIG. 4 shows a flow of the direct communication restriction determination processing in this case. The processing in FIG. 4 is executed by the direct communication restriction determination unit 205.

In this processing, the direct communication restriction determination unit 205 determines whether the STA/AP 101 has started the AP function by using the base station control unit 203 (S401). The determination in this case is performed by determining whether the STA/AP 101 has transmitted a Beacon by serving as an AP and has formed the wireless network 106, as a result of the AP function having been started by the base station control unit 203, for example. If the direct communication restriction determination unit 205 determines that the STA/AP 101 has started the AP function (YES in S401), the direct communication restriction determination unit 205 determines not to respond to the received TDLS Discovery Request (S402). That is to say, when the STA/AP 101 has formed the wireless network by serving as an AP, the direct communication restriction determination unit 205 prohibits establishment of a direct communication by means of TDLS, by not responding to the TDLS Discovery Request. Establishment of a direct connection between the STA/AP 101 and the STA 103 is thereby restricted, and it is possible to prevent an increase in the number of connections handled by the STA/AP 101. Furthermore, it is possible to prevent the establishment of the direct connection from affecting existing connections in the wireless network 106 that has been formed by the STA/AP 101 serving as an AP by that time, for example.

On the other hand, if the direct communication restriction determination unit 205 determines that the STA/AP 101 has not started the AP function (NO in S401), the direct communication restriction determination unit 205 determines to respond to the received TDLS Discovery Request (S403). Note that the response signal in this case is a TDLS Discovery Response. This is because, in this case, the STA/AP 101 has not formed a wireless network by serving as an AP and it is considered that the number of already-established connections is not large, and accordingly the control will not become too complicated even if a new direct connection is established.

Returning to FIG. 3, if it is determined to transmit the TDLS Discovery Response, the STA/AP 101 responds by transmitting the TDLS Discovery Response to the STA 103 via the AP 102 (S303). On the other hand, if, in step S402, it is determined not to respond, the STA/AP 101 does not transmit the TDLS Discovery Response in step S303.

Thus, the STA/AP 101 determines whether to respond to a search for a partner device of a direct connection by the STA 103, in accordance with whether the STA/AP 101 has activated the AP function, i.e., whether the STA/AP 101 has formed the wireless network 106, which is different from the wireless network 105 related to the direct connection. The STA/AP 101 can thereby prevent an excessive increase in the number of established connections, and stabilization of communication processing can be achieved. Note that the STA 103 can determine whether the STA/AP 101 is in a state of being able to establish a direct connection, from the fact that there is no response from the STA/AP 101 to the search for a partner device.

Processing Example 2

Figure 5:
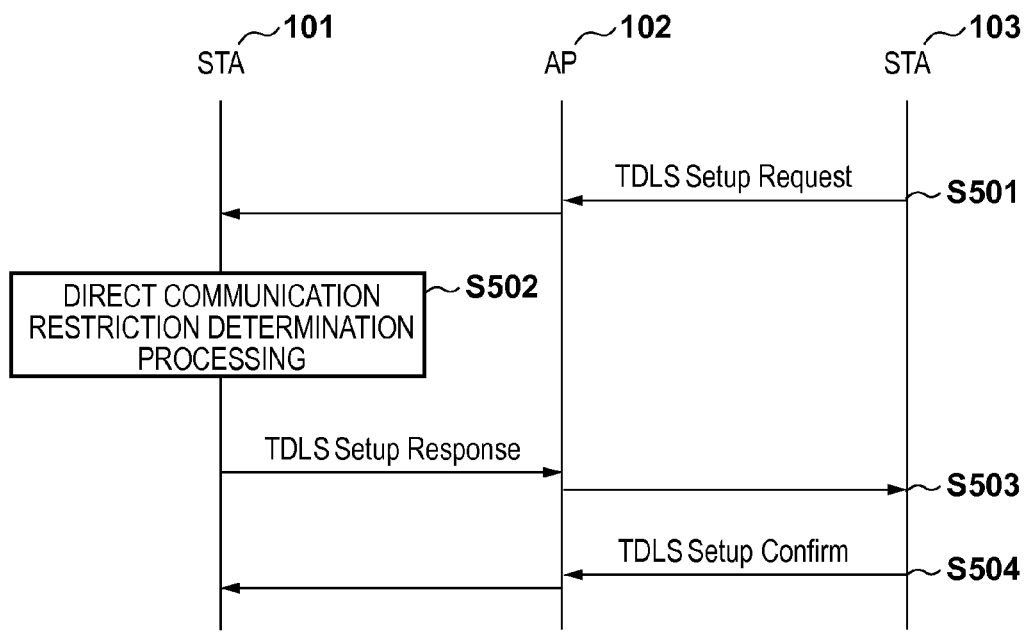
FIG. 5 is a sequence chart showing a second example of a processing flow in Embodiment 1.

FIG. 5 shows a second example of a processing flow in the present embodiment. In this example, the STA/AP 101 receives a TDLS Setup Request from the STA 103 via the AP 102. A TDLS Setup Request is a frame for giving a request that is defined in the IEEE802.11 standard and is for establishing a direct connection.

Initially, the STA 103 transmits a TDLS Setup Request to the STA/AP 101 via the AP 102 in order to establish a direct connection to the STA/AP 101 (S501). The STA/AP 101, upon receiving the TDLS Setup Request, executes direct communication restriction determination processing in order to determine whether the STA/AP 101 is in a state of being able to execute direct communication (S502).

Figure 6:
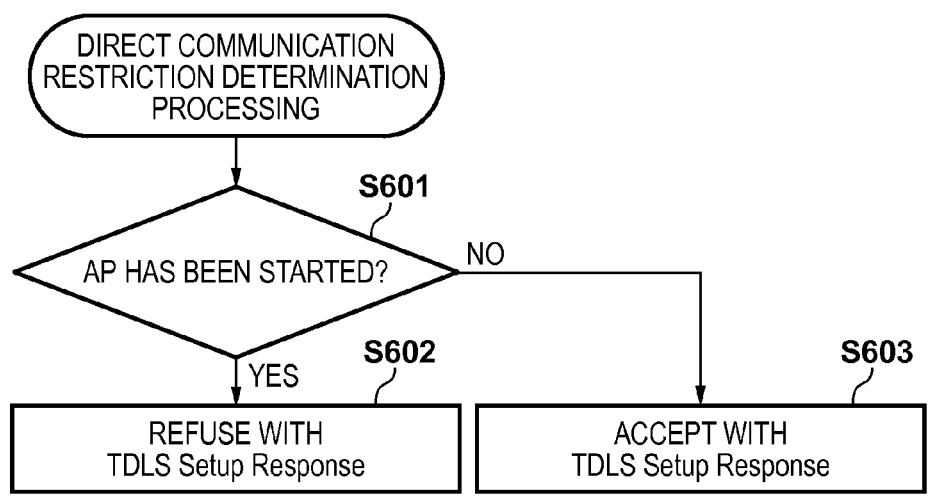
FIG. 6 is a flowchart showing a second example of direct communication restriction determination processing in Embodiment 1.

FIG. 6 shows a flow of the direct communication restriction determination processing in this case. The processing in FIG. 6 is also executed by the direct communication restriction determination unit 205, as in the processing example 1.

In this processing, the direct communication restriction determination unit 205 determines whether the STA/AP 101 has started the AP function, as in step S401 in the processing example 1 (S601). If the direct communication restriction determination unit 205 determines that the STA/AP 101 has started the AP function (YES in S601), the direct communication restriction determination unit 205 determines to refuse the received TDLS Setup Request (S602). That is to say, if the STA/AP 101 has formed the wireless network 106 that is different from the wireless network 105 formed by the AP 102, the direct communication restriction determination unit 205 refuses the TDLS Setup Request. In this case, the STA/AP 101 designates REFUSED (=1) as a Status Code of a TDLS Setup Response frame and transmits it. Establishment of a direct connection to the STA 103 is thereby restricted, and it is possible to prevent the establishment of a direct connection from affecting existing connections in the network formed by the STA/AP 101, for example. Note that the Status Code designated here may be any value for refusing establishment of a direct connection, and other values may be used as long as the values are other than SUCCESS (=0). Furthermore, the STA/AP 101 may communicate refusal of establishment of a connection by not responding, rather than by responding using the TDLS Setup Response.

On the other hand, if the direct communication restriction determination unit 205 determines that the STA/AP 101 has not started the AP function (NO in S601), the direct communication restriction determination unit 205 determines not to refuse the received TDLS Setup Request, and to respond thereto (S603). That is to say, in this case, the STA/AP 101 designates SUCCESS (=0) as the Status Code of the TDLS Setup Response frame and transmits it.

Returning to FIG. 5, the STA/AP 101, after executing the aforementioned direct communication restriction determination, transmits the TDLS Setup Response containing the Status Code corresponding to the determination to the STA 103 via the AP 102 (S503). If the STA 103 receives the TDLS Setup Response with the Status Code that is SUCCESS, the STA 103 transmits TDLS Setup Confirm (S504), and a direct connection between the STA/AP 101 and the STA 103 is thereby established. On the other hand, if the Status Code is other than SUCCESS, e.g., if the Status Code is REFUSED, the STA 103 does not transmit the TDLS Setup Confirm in step S504. Accordingly, in this case, a direct connection is not established.

As described above, in the processing examples 1 and 2, even if the STA/AP 101 receives a request to search for a partner device of a direct connection or a request to establish a direct connection, the STA/AP 101 does not respond to the request or refuses it, in order to restrict the setting of the direct communication. With this configuration, when the STA/AP 101 has formed the wireless network 106 by serving as an AP, the STA/AP 101 does not establish a direct connection to other STAs. Since a direct connection is thereby not established, it is possible to prevent the STA/AP 101 from controlling communication using many wireless connections including a connection using the AP function, a connection using the STA function, and a direct connection by means of TDLS, and communication control can be stabilized.

Processing Example 3

The above processing examples 1 and 2 have described the exemplary case where, when the STA/AP 101 receives a request to search for a partner device of a direct connection or a request to establish a direct connection, the STA/AP 101 does not respond to the request, or refuses it. In contrast, in this example, when the STA/AP 101 has formed a wireless network using the AP function, the STA/AP 101 limits channels available for the direct connection. A flow of this processing will be described below using a flowchart in FIG. 7. Note that the processing flow in the overall system in this case is similar to that in FIG. 3 or 5.

Initially, the direct communication restriction determination unit 205, upon receiving the TDLS Discovery Request or the TDLS Setup Request, determines whether the STA/AP 101 has started the AP function, as in step S401 or S601 described above (S701). If the direct communication restriction determination unit 205 determines that the STA/AP 101 has started the AP function (YES in S701), the direct communication restriction determination unit 205 notifies, using the TDLS Setup Response, the STA 103 of information of the channel used in the wireless network that has been formed using the AP function. Specifically, a wireless channel that is currently being used by the AP function is designated as a supported channel in a Supported Channels element of the TDLS Setup Response (S702). For example, when the wireless network 106 uses the wireless channel 5ch, 5ch is set as a supported channel in the Supported Channels element of the TDLS Setup Response. Also, SUCCESS (=0) is designated as the Status Code. Note that, since the wireless network 105 and the wireless network 106 use the same channel in this example, the wireless channel that is currently being used by the AP function is the same as the wireless channel that is currently being used by the STA function. Note that, if different wireless channels are used by the AP function and the STA function, either or both of them may be designated.

On the other hand, if the direct communication restriction determination unit 205 determines that the STA/AP 101 has not started the AP function (NO in S701), the direct communication restriction determination unit 205 designates information of all channels, for example, in the TDLS Setup Response (S703). That is to say, all wireless channels supported by the RF control unit 201 are designated as the supported channels in the Supported Channels element of the TDLS Setup Response. For example, if the RF control unit 201 supports 1ch to 11ch, all of 1ch to 11ch are set as the supported channels in the Supported Channels element of the TDLS Setup Response. Also, SUCCESS (=0) is designated as the Status Code.

The STA 103 can thereby recognize that communication by means of a direct connection can be performed using any of the wireless channels designated by the STA/AP 101. As a result, when the STA/AP 101 has formed the wireless network 106 by serving as an AP, a direct connection to the STA 103 is established using the wireless channel that is currently being used. As a result, it is possible to suppress arrival from the STA 103 of a request to switch the channel to a wireless channel that is currently not being used. That is to say, in this case, even if the channel switching request arrives from the STA 103, the channel designated in this request is restricted to the channel that is currently being used by the STA/AP 101, and accordingly the STA/AP 101 substantially does not need to switch the channel. For this reason, the STA/AP 101 will not lose a packet transmitted from, for example, the STA 104 in the wireless network 106 while the channel has been switched.

Figure 7:
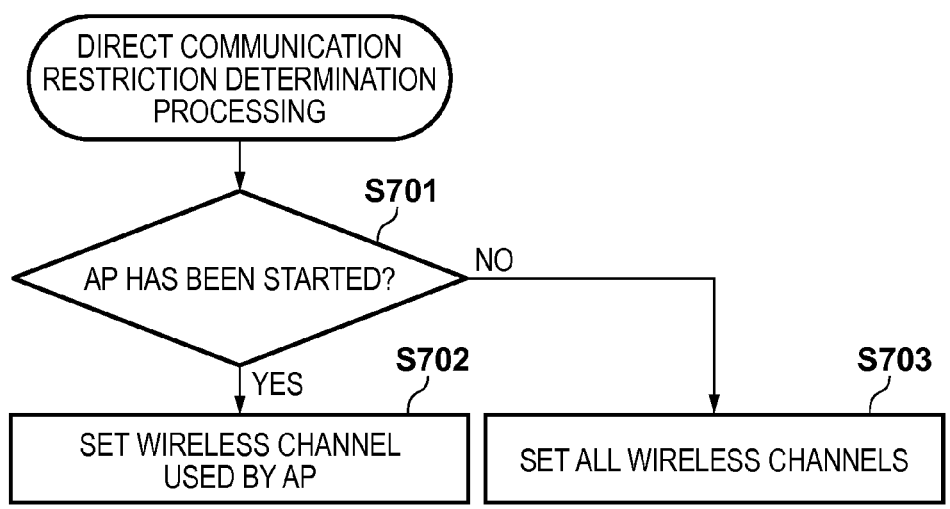
FIG. 7 is a flowchart showing a third example of direct communication restriction determination processing in Embodiment 1.

Although the example in the case of receiving the TDLS Setup Request has been described in FIG. 7, similar processing can also be performed in the case of receiving the TDLS Discovery Request. The STA/AP 101 can thereby notify, in advance, the STA 103 of whether the channel can be switched, when establishing a direct connection.

As described above, in this example, when the STA/AP 101 has started the AP function, the STA/AP 101 designates only the channel that the STA/AP 101 serving as an AP is using, as the supported channel of the TDLS Setup Response and the TDLS Discovery Response. It is thereby possible to restrict switching of the channel in a direct connection.

Processing Example 4

Figure 8:
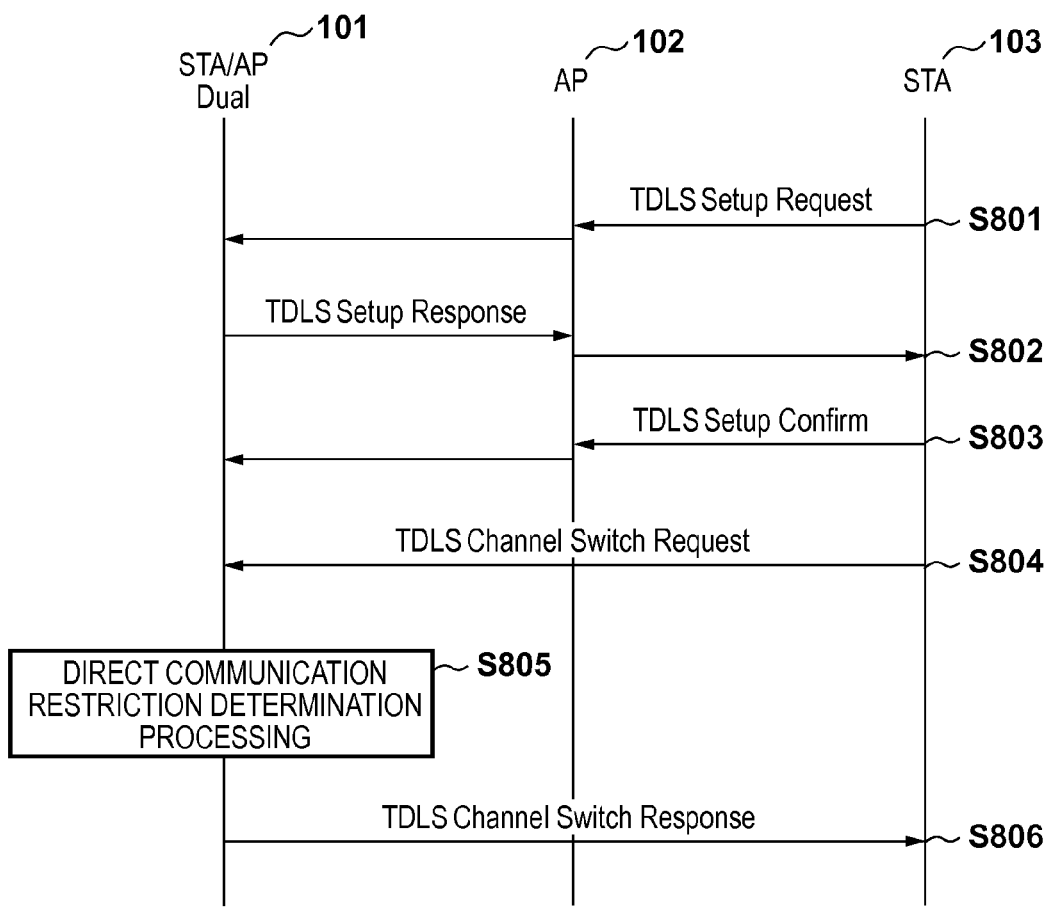
FIG. 8 is a sequence chart showing a fourth example of a processing flow in Embodiment 1.

FIG. 8 shows a fourth example of a processing flow in the present embodiment. In this example, the STA/AP 101 receives a channel switching request (TDLS Channel Switch Request) from the STA 103 without via the AP 102. A TDLS Channel Switch Request is a frame that is defined in the IEEE802.11 standard and is for giving a request to switch the channel. Note that the TDLS Channel Switch Request is transmitted after a direct connection by means of TDLS is established.

That is to say, in this example, a direct connection is first established between the STA/AP 101 and the STA 103. Specifically, the STA/AP 101, upon receiving the TDLS Setup Request from the STA 103 (S801), responds using a TDLS Setup Response with a Status Code that is SUCCESS (=0) (S802). In response thereto, the STA 103 transmits TDLS Setup Confirm, and the STA/AP 101 receives this TDLS Setup Confirm (S803). A direct connection between the STA/AP 101 and the STA 103 is thereby established. Note that, at the time of this response, the STA/AP 101 designates all wireless channels supported by the RF control unit 201, and notifies the STA 103 thereof. For example, if the RF control unit 201 supports 1ch to 11ch, all of 1ch to 11ch are set as the supported channels in the Supported Channels element of the TDLS Setup Response.

After the direct connection is established, the STA 103 directly transmits a TDLS Channel Switch Request to the STA/AP 101 without via the AP 102 before transmitting data, in order to switch the channel (S804). The STA/AP 101, upon receiving the TDLS Channel Switch Request, executes direct communication restriction determination processing (S805).

Figure 9:
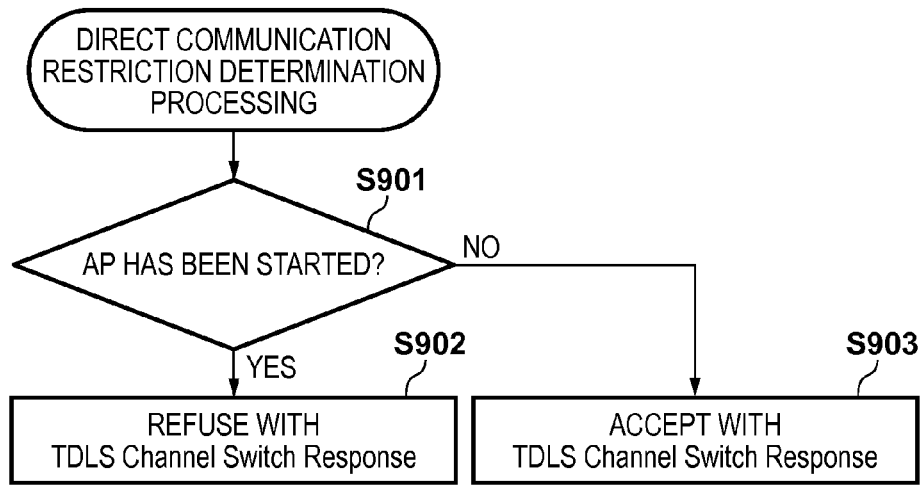
FIG. 9 is a flowchart showing a fourth example of direct communication restriction determination processing in Embodiment 1.

FIG. 9 shows a flow of the direct communication restriction determination processing in this case. The processing in FIG. 9 is also executed by the direct communication restriction determination unit 205, as in the processing examples 1 to 3.

In this processing, the direct communication restriction determination unit 205 initially determines whether the STA/AP 101 has started the AP function, as in the processing examples 1 to 3 (S901). If the direct communication restriction determination unit 205 determines that the STA/AP 101 has started the AP function (YES in S901), the direct communication restriction determination unit 205 determines to refuse the channel switching request (S902). That is to say, if the STA/AP 101 has formed the wireless network 106, the direct communication restriction determination unit 205 refuses the TDLS Channel Switch Request. In this case, the STA/AP 101 designates REFUSE (=1) as a Status Code of the TDLS Channel Switch Response and transmits it, for example. Switching of the channel in a direct connection to the STA 103 is thereby restricted, and it is possible to prevent the channel switching in the direct connection from affecting other connections established by the STA/AP 101. Note that the Status Code designated here may be any value for refusing the channel switching request, and the channel switching request may be refused by substituting a value other than SUCCESS (=0) for the Status Code. Furthermore, the refusal of switching of the channel may be communicated by not responding to the channel switching request. Note that a description will be hereinafter given of the case where a response is given with REFUSE (=1) designated as the Status Code when the channel switching request is refused.

Note that, on the other hand, if the direct communication restriction determination unit 205 determines in step S901 that the STA/AP 101 has not started the AP function (NO in S901), the direct communication restriction determination unit 205 determines to accept the channel switching request (S903). In this case, the STA/AP 101 designates SUCCESS (=0) as the Status Code of the TDLS Channel Switch Response and transmits it.

Returning to FIG. 8, the STA/AP 101, after executing the aforementioned direct communication restriction determination, transmits the TDLS Channel Switch Response containing the Status Code corresponding to the determination to the STA 103 without via the AP 102 (S806). If the STA 103 receives the TDLS Channel Switch Response with the Status Code that is SUCCESS (=0), the STA/AP 101 and the STA 103 switch their channel in conformity to the IEEE802.11 standard. The STA/AP 101 and the STA 103 then start direct communication over the channel after the switching. On the other hand, if the STA 103 receives the TDLS Channel Switch Response with the Status Code that is REFUSE (=1), switching of the channel is not performed and the processing is finished in this state.

With this configuration, in this example, if the STA/AP 101 has established the wireless network 106 by serving as an AP, the direct connection operation is restricted such that channel switching in a direct connection is not performed. For this reason, for example, the STA/AP 101 can prevent communication from becoming unstable, as in the case of losing a packet transmitted from the STA 104 in the wireless network 106 that the STA/AP 101 has formed by itself, due to the channel switching.

Processing Example 5

Figure 10:
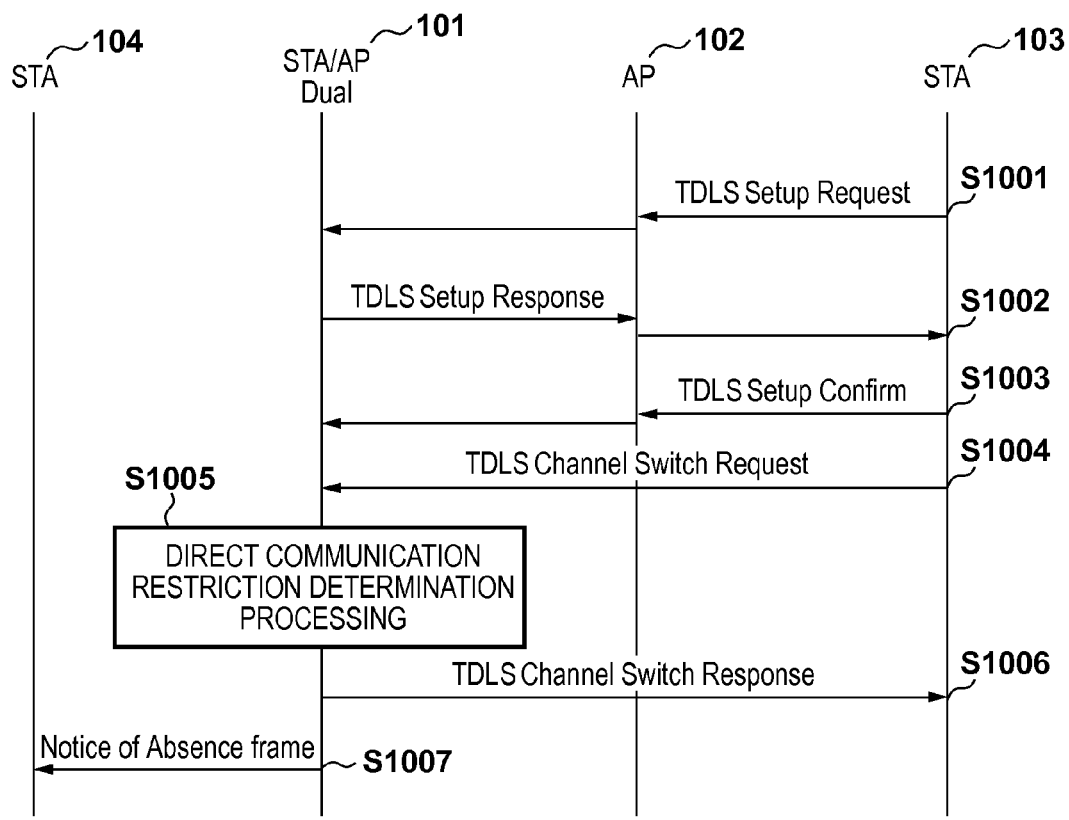
FIG. 10 is a sequence chart showing a fifth example of a processing flow in Embodiment 1.

In this example, the STA/AP 101 determines whether to switch the channel, in accordance with communication devices that have joined the wireless network 106. Note that, in this example, the terminal station control unit 202 includes a function for operating as a P2P Group Owner (hereinafter referred to as "GO") of Wi-Fi Direct, and the wireless network 106 is a wireless network that may possibly be generated by the GO function. FIG. 10 shows a fifth example of a processing flow in the present embodiment. In this example, the STA/AP 101 receives a channel switching request (TDLS Channel Switch Request) from the STA 103 without via the AP 102. Note that processing in steps S1001 to S1004 and S1006 is similar to the processing in steps S801 to S804 and S806, and accordingly a description thereof will be omitted. Note that, in this example, the direct communication restriction determination processing in step S1005 is different from the processing in step S805 in the processing example 4.

Figure 11:
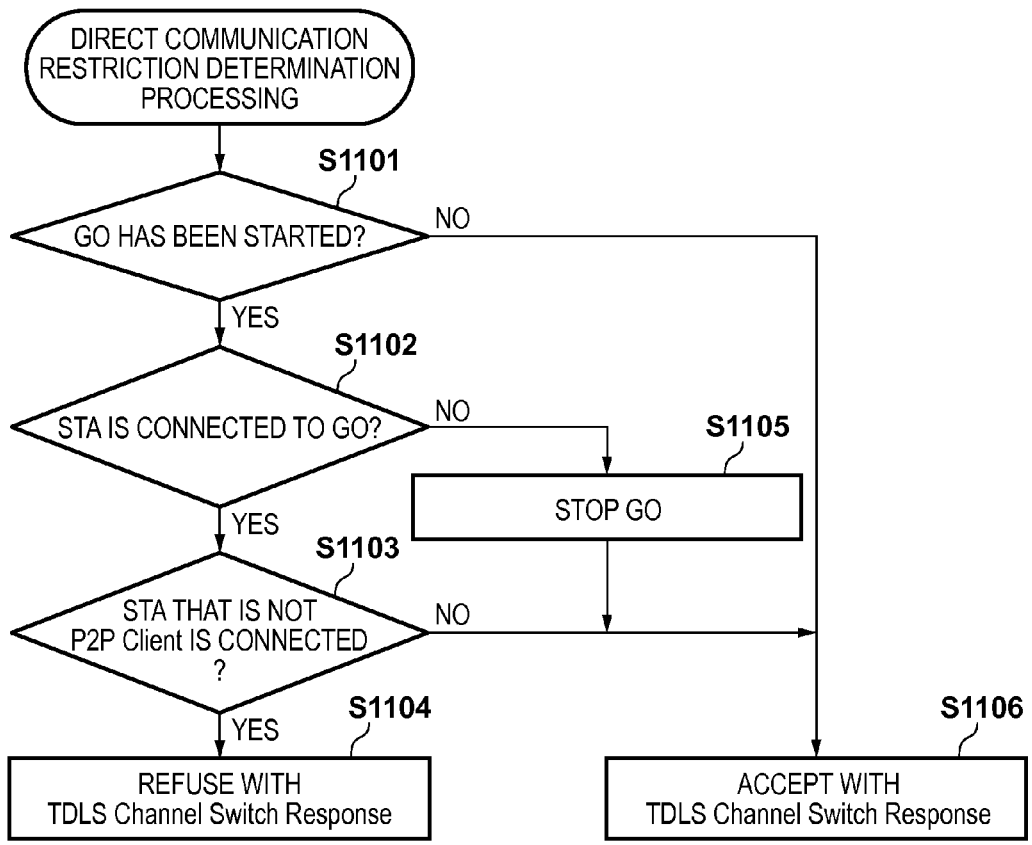
FIG. 11 is a flowchart showing a fifth example of direct communication restriction determination processing in Embodiment 1.

In this processing, the STA/AP 101 determines whether there is a STA that cannot interpret a message indicating a stop of communication in the wireless network 106 formed by the STA/AP 101, among communication devices (STAs) that are connected to the wireless network 106. If there is no STA that cannot interpret such a message indicating a stop of communication, the STA/AP 101 transmits the message indicating a stop of communication to the STAs, and thereafter executes switching of the channel. If a STA that cannot interpret the message indicating a stop of communication has joined the wireless network 106, the STA/AP 101 does not switch the channel. As a result of thus notifying the STAs that have joined the wireless network 106 of a stop of communication in this wireless network, a packet loss will not occur in the wireless network 106 even if the channel is switched, while the communication is stopped. If a STA that cannot interpret the message indicating a stop of communication has joined the wireless network 106, similarly, a packet loss in the wireless network 106 can be prevented by not switching the channel. A flow of the direct communication restriction determination processing in this example will be described below using FIG. 11. The processing in FIG. 11 is also executed by the direct communication restriction determination unit 205, as in the processing examples 1 to 4.

In this processing, the direct communication restriction determination unit 205 initially determines whether the GO function has been started (S1101). At this time, if the direct communication restriction determination unit 205 determines that the GO function has not been started (NO in S1101), the direct communication restriction determination unit 205 decides to accept a channel switching request (S1106). The accepting operation in this case is similar to step S903 in FIG. 9. On the other hand, if the direct communication restriction determination unit 205 determines that the GO function has been started (YES in S1101), the direct communication restriction determination unit 205 subsequently determines whether there is a STA that is connected to the GO (S1102). That is to say, the direct communication restriction determination unit 205 determines whether there is a STA other than the STA/AP 101 that has joined the wireless network 106.

If the direct communication restriction determination unit 205 determines that there is a STA connected to the GO (YES in S1102), the direct communication restriction determination unit 205 subsequently determines whether the connected STA is a P2P Client (S1103). This determination corresponds to processing for determining whether the STA connected to the GO can interpret a later-described Notice of Absence frame, which is defined in Wi-Fi Direct. Note that the Notice of Absence frame is a frame indicating a stop of communication in the wireless network 106.

If the direct communication restriction determination unit 205 determines that the STA connected to the GO is not a P2P Client (YES in S1103), the direct communication restriction determination unit 205 decides to refuse the TDLS Channel Switch Request (S1104). The refusing operation at this time is similar to step S902 in FIG. 9. On the other hand, if there is no STA connected to the GO (NO in S1102), or if all STAs connected to the GO are P2P Clients (NO in S1103), the direct communication restriction determination unit 205 decides to accept the channel switching request (S1106). The accepting operation in this case is similar to step S903 in FIG. 9. Note that, if there is no STA connected to the GO, the STA/AP 101 may perform control so as to stop the GO function (S1105). Note that, after stopping the GO function in step S1105, the STA/AP 101 may resume the GO function when returning to the original channel of the wireless network 106 from the switched channel.

Returning to FIG. 10, the STA/AP 101, after executing the aforementioned direct communication restriction determination, transmits the TDLS Channel Switch Response containing the Status Code corresponding to the determination, to the STA 103 without via the AP 102 (S1006). If the STA/AP 101 transmits the TDLS Channel Switch Response with the Status Code that is SUCCESS (=0), the STA/AP 101 transmits the Notice of Absence frame in the wireless network 106 (S1007). The TDLS Channel Switch Response with the Status Code that is SUCCESS (=0) is transmitted in the case where all STAs that have joined the wireless network 106 are P2P Clients, for example. Accordingly, in this case, the STAs that have joined the wireless network 106 can interpret the Notice of Absence frame. Note that a P2P Client that receives the Notice of Absence frame understands that communication with the STA/AP 101 is stopped only during a designated period, and accordingly ceases to transmit packets. At this time, the designated period may be a prescribed period that is defined in advance, or may be a period designated by the Notice of Absence frame.

Thereafter, the STA/AP 101 and the STA 103 switch their channel in conformity to the IEEE802.11 standard. Then the STA/AP 101 and the STA 103 start direct communication over the channel after the switching. Note that, after finishing communication after the channel switching in the direct connection, the STA/AP 101 restores the channel and resumes communication in the wireless network 106.

On the other hand, if the STA 103 receives the TDLS Channel Switch Response with the Status Code that is REFUSE (=1), switching of the channel is not performed and the processing is finished in this state. For example, the channel is not switched if a STA that cannot interpret the Notice of Absence frame and is not a P2P Client has joined the wireless network 106. It is thereby possible, when the channel is switched, to prevent a STA from transmitting a packet while not knowing that communication in the wireless network 106 has stopped, and to prevent occurrence of a packet loss.

Note that the Notice of Absence frame is not transmitted when there is no STA connected to the GO or when the GO function has not been started. This is because no partner device that receives this frame exists in such cases.

Thus, the STA/AP 101 in this example determines whether to accept channel switching, depending on the communication devices that have joined the wireless network 106. It is thereby possible to allow channel switching in a situation where a packet loss does not occur in the wireless network 106, and meanwhile to restrict channel switching when there is a possibility that a packet loss occurs in the wireless network 106.

Note that, in the processing examples 3 to 5, establishment of a direct connection between the STA/AP 101 and the STA 103 is allowed even when the STA/AP 101 has formed the wireless network 106 by serving as an AP, unlike in the above processing examples 1 and 2. Accordingly, the STA/AP 101 and the STA 103 can directly communicate with each other, without via the AP 102. Communication overhead caused due to communicating via the AP 102 can thereby be reduced. Furthermore, communication that exceeds the communication capability of the wireless network 105 can be performed between the STA/AP 101 and the STA 103. For example, even if the AP 102 supports only 64QAM as a modulation method, 256QAM can be used as a modulation method in the communication between the STA/AP 101 and the STA 103, and high-speed communication can be realized.

Embodiment 2

In the present embodiment, it is assumed that the STA/AP 101 joins, by serving as a STA, the wireless network 105 formed by the AP 102, and has established a direct connection to the STA 103 that has also joined the wireless network 105. That is to say, at this time point, the STA/AP 101 has established two connections, namely the connection to the AP 102 and the direct connection to the STA 103. The present embodiment will describe processing in the case where, in this state, the STA/AP 101 further forms the wireless network 106 by serving as an AP, or in the case where the STA/AP 101 establishes an additional direct connection to the STA 104 via the AP 102 or another AP (not shown). In the following example, as the processing in this case, the STA/AP 101 executes disconnection of the direct connection to the STA 103 that has been established by this time, restriction on establishment of the wireless network 106 by using the AP function, and restriction on further establishment of the direct connection to the STA 104. It is thereby possible to prevent the number of connections established by the STA/AP 101 from increasing, and to improve the stability of communication. Hereinafter, some examples of the specific processing flow will be described.

Processing Example 1

Figure 12:
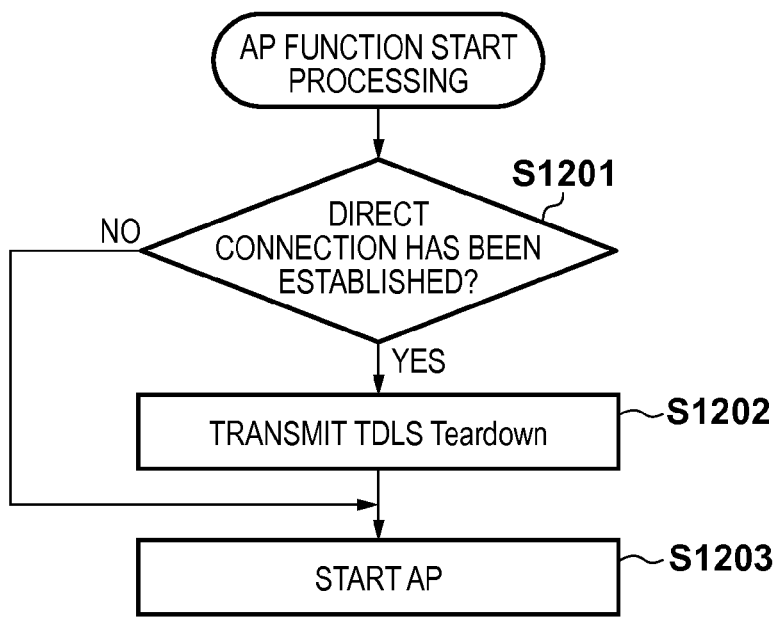
FIG. 12 is a flowchart showing a first example of AP function start processing in Embodiment 2.

FIG. 12 shows a first example of a processing flow in the present embodiment. In this example, the STA/AP 101 attempts to form the wireless network 106 by using the AP function, while the direct connection to the STA 103 has been established. The processing in FIG. 12 is processing that is executed when the base station control unit 203 activates the AP function, for example.

In this processing, the base station control unit 203, before activating the AP function, initially determines whether a direct connection by means of TDLS has been established (S1201). If the base station control unit 203 determines that a direct connection has been established (YES in S1201), the base station control unit 203 transmits TDLS Teardown to a partner device of the direct connection, and thereby disconnects the direct connection (S1202). The base station control unit 203 then activates the AP function after disconnecting the direct connection (S1203). On the other hand, if the base station control unit 203 determines that a direct connection has not been established (NO in S1201), the base station control unit 203 activates the AP function in this state (S1203).

With this configuration, even when the STA/AP 101 is to newly form a wireless network using the AP function while a direct connection has been established, it is possible to suppress the number of connections that have been simultaneously established, by disconnecting the direct connection. Accordingly, it is possible to prevent wireless processing from becoming excessively complicated, and to improve the stability of communication.

Processing Example 2

Figure 13:
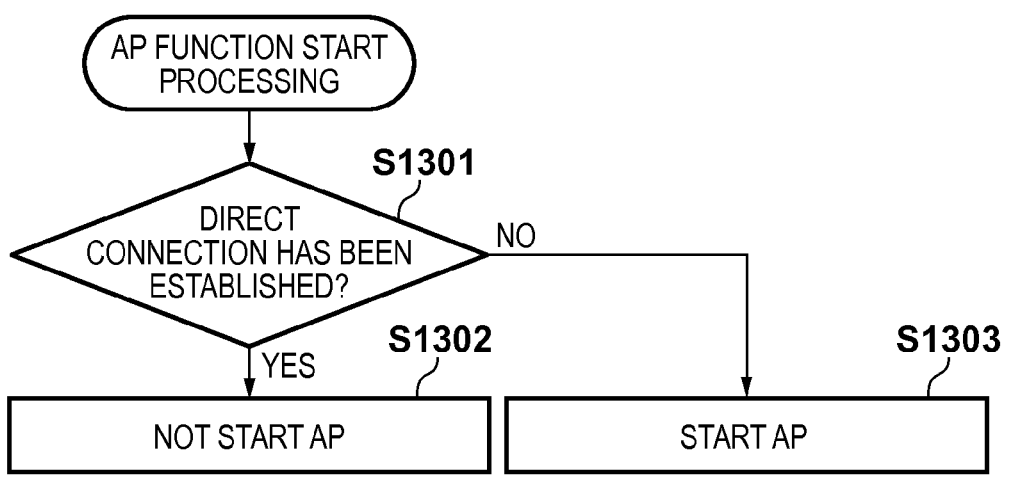
FIG. 13 is a flowchart showing a second example of the AP function start processing in Embodiment 2.

FIG. 13 shows a second example of a processing flow in the present embodiment. In this example as well, the STA/AP 101 attempts to form the wireless network 106 by using the AP function, while a direct connection to the STA 103 has been established. The processing in FIG. 13 is also processing that is executed when the base station control unit 203 activates the AP function, for example.

In this processing, the STA/AP 101, before activating the AP function, initially determines whether a direct connection by means of TDLS has been established (S1301). If the base station control unit 203 determines that a direct connection has been established (YES in S1301), the base station control unit 203 decides not to activate the AP function (S1302). On the other hand, if the base station control unit 203 determines that a direct connection has not been established (NO in S1301), the base station control unit 203 activates the AP function in this state (S1303).

With this operation, while a direct connection has been established, the STA/AP 101 performs control so as not to newly form a wireless network by using the AP function, and the number of connections that have been simultaneously established can be suppressed. Accordingly, it is possible to prevent wireless processing from becoming excessively complicated, and to improve the stability of communication.

Note that, in the processing examples 1 and 2, the STA/AP 101 attempts to form the wireless network 106 by serving as an AP, in accordance with an instruction from a user (not shown) of the STA/AP 101, or in accordance with an instruction from another communication device, for example. Alternatively, the STA/AP 101 may start to form the wireless network 106 in accordance with other triggers. In any case, the processing in the above processing examples 1 or 2 is executed when the STA/AP 101 attempts to start to form the wireless network 106 by serving as an AP in accordance with some kind of trigger.

Processing Example 3

Figure 14:
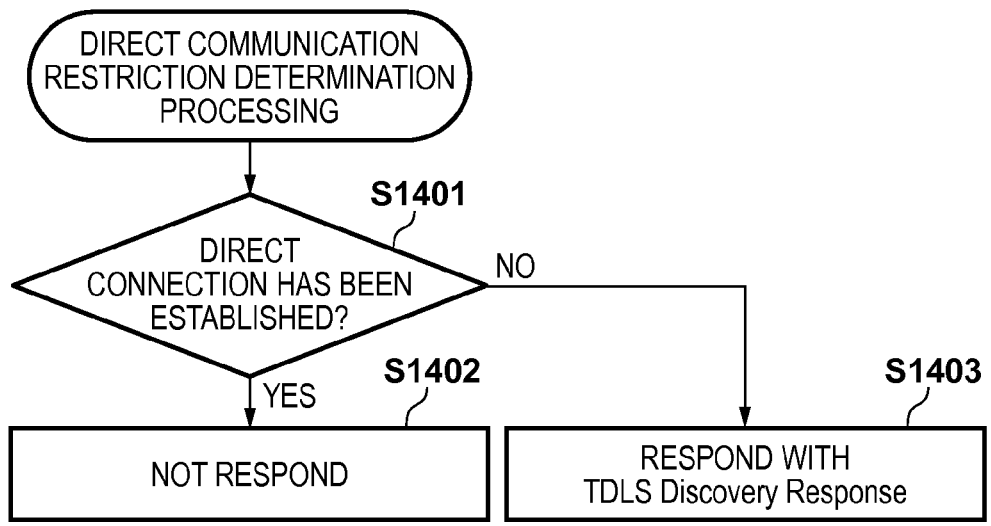
FIG. 14 is a flowchart showing a first example of direct communication restriction determination processing in Embodiment 2.

FIG. 14 shows a third example of a processing flow in the present embodiment. In this example, the STA/AP 101 attempts to form a direct connection to another terminal (STA 104) while a direct connection to the STA 103 has been established. Note that, here, the direct connection with the other terminal is also a direct connection by means of TDLS that is established via the AP 102 or another AP. The processing in FIG. 14 is direct communication restriction determination processing that is executed by the direct communication restriction determination unit 205 when a TDLS Discovery Request is received.

The direct communication restriction determination unit 205, upon receiving the TDLS Discovery Request, determines whether the STA/AP 101 has already established a direct connection to the STA 103 by using the direct communication control unit 204 (S1401). If the direct communication restriction determination unit 205 determines that the direct connection to the STA 103 has been established (YES in S1401), the direct communication restriction determination unit 205 decides not to respond to the received TDLS Discovery Request (S1402). That is to say, the STA/AP 101 restricts establishment of an additional direct connection to another STA by not responding to the TDLS Discovery Request. On the other hand, if the direct communication restriction determination unit 205 determines that the direct connection to the STA 103 has not been established (NO in S1401), the direct communication restriction determination unit 205 decides to respond to the received TDLS Discovery Request (S1403). If, in step S1403, it is decided to respond, the STA/AP 101 transmits a TDLS Discovery Response frame to the STA 103.

With this operation, while a direct connection has been established, the STA/AP 101 performs control so as not to form an additional direct connection, and the number of connections that have been simultaneously established can be suppressed. Accordingly, it is possible to prevent wireless processing from becoming excessively complicated, and to improve the stability of communication.

Processing Example 4

Figure 15:
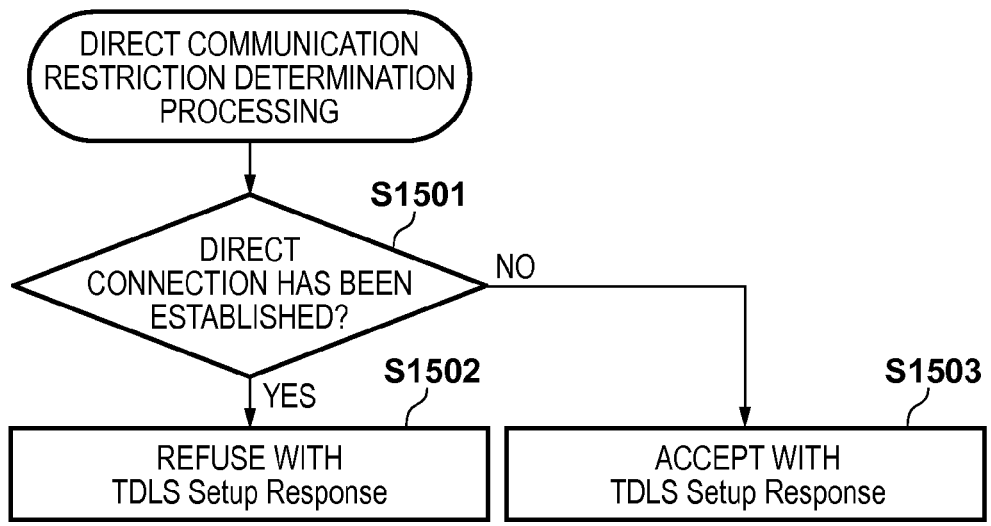
FIG. 15 is a flowchart showing a second example of direct communication restriction determination processing in Embodiment 2.

FIG. 15 shows a fourth example of a processing flow in the present embodiment. In this example, the STA/AP 101 attempts to form a direct connection to another terminal (STA 104) while a direct connection to the STA 103 has been established. Note that, here, the direct connection with the other terminal is also a direct connection by means of TDLS that is established via the AP 102 or another AP. The processing in FIG. 15 is direct communication restriction determination processing that is executed by the direct communication restriction determination unit 205 when a TDLS Setup Request is received.

In this example, the direct communication restriction determination unit 205 initially determines whether the STA/AP 101 has already established a direct connection to the STA 103 by using the direct communication control unit 204 (S1501). If the direct communication restriction determination unit 205 determines that the direct connection to the STA 103 has been established (YES in S1501), the direct communication restriction determination unit 205 decides to respond in order to refuse the received TDLS Setup Request (S1502). That is to say, in this case, the direct communication restriction determination unit 205 decides to designate REFUSED (=1) as a Status Code of a TDLS Setup Response frame and transmit it. Note that the Status Code designated here may be any value for refusing establishment of a direct link, and need only be a value other than SUCCESS (=0). Note that, in this case, refusal of the connection establishment request may be communicated to the partner device by not responding to the TDLS Setup Request, as in Embodiment 1 described above.

On the other hand, if the direct communication restriction determination unit 205 determines that the direct connection to the STA 103 has not been established (NO in S1501), the direct communication restriction determination unit 205 decides to accept the received TDLS Setup Request (S1503). That is to say, in this case, the direct communication restriction determination unit 205 decides to designate SUCCESS (=0) as the Status Code of the TDLS Setup Response frame and transmit it.

Thus, in the processing examples 3 and 4, if, while a direct connection has already been established, a request to search for a partner device of a direct connection or a request to establish a direct connection is received from another STA, the direct communication restriction determination unit 205 decides not to respond to the request, or to refuse the request. It is thereby possible to prevent an additional direct connection from being established in a situation where a direct connection has already been established, and the STA/AP 101 can suppress the number of connections that have been simultaneously established. Accordingly, it is possible to prevent wireless processing from becoming excessively complicated, and to improve the stability of communication.

Note that the above embodiments have described the example where the STA 103 or the like inquires whether the STA/AP 101 has the direct connection capability, by using a TDLS Discovery Request, for example. However, the inquiry about whether the STA/AP 101 has the direct connection capability may be made by using a frame other than the TDLS Discovery Request. For example, a Probe Request or a Service Discovery to which a WFD information element (IE) defined in Wi-Fi Display is added may be used. In this case, the STA/AP 101, when receiving the Probe Request, determines whether the AP function has been started. If the AP function has been started, the STA/AP 101 designates 0b0 (=P2P) as a PC (Preferred Connectivity) bit in a WFD Device Information Subelement of WFD IE. The STA/AP 101 can thereby notify the STA 103 of information indicating that the STA/AP 101 does not support direct communication.

According to the present invention, in a communication device, a direct connection to another communication device can be controlled based on a state of other connections.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-035997, filed Feb. 26, 2014, which is hereby incorporated by reference herein in its entirety.

What is claimed is:

1. A communication device comprising:
   a communication unit including a first function for forming a network, a second function for joining a network formed by a first other communication device, and a third function for communicating with a second other communication device that has joined the network formed by the first other communication device, through a direct connection based on the network formed by the first other communication device, when the communication device has joined, using the second function, the network formed by the first other communication device; and
   a control unit configured to control the third function so as to restrict a channel to be used in the direct connection using the third function, when the network has been formed by the first function.

2. The communication device according to claim 1, wherein, when the network has been formed by the first function, the control unit controls the third function so as to restrict the channel to be used by the third function, by controlling the communication unit so as to include information of a channel used in the network formed by the first function in a response to a search for a partner device for the direct connection or a request to establish the direct connection from the second other communication device, and transmits the response to the second other communication device.

3. The communication device according to claim 1, wherein, when the network has been formed by the first function and the direct connection using the third function has been established, the control unit controls the third function so as to restrict the channel to be used by the third function, by not responding to a request to switch a channel for the direct connection from the second other communication device, or by refusing the request.

4. The communication device according to claim 1, wherein, when the network has been formed by the first function and the direct connection has also been established by the third function, if a request to switch the channel for the direct connection is given from the second other communication device, the control unit controls the third function so as to switch the channel after transmitting a message indicating that communication in the network formed by the first function is stopped, to another communication device that has joined the network formed by the first function.

5. The communication device according to claim 4, wherein, when the network has been formed by the first function and the direct connection has also been established by the third function, if a request to switch the channel for the direct connection is given from the second other communication device and no other communication device that cannot interpret the message has joined the network formed by the first function, the control unit controls the third function so as to switch the channel in accordance with the request to switch the channel.

6. The communication device according to claim 4, wherein, when the network has been formed by the first function and the direct connection has also been established by the third function, if a request to switch the channel for the direct connection is given from the second other communication device and another communication device that cannot interpret the message has joined the network formed by the first function, the control unit controls the third function so as to restrict the channel to be used by the third function, by not responding to the request to switch the channel or by refusing the request.

7. The communication device according to claim 4, wherein, when the network has been formed by the first function and the direct connection has also been established by the third function, if a request to switch the channel for the direct connection is given from the second other communication device and no other communication device has joined the network formed by the first function, the control unit controls the third function so as to switch the channel in accordance with the request to switch the channel.

8. A method for controlling a communication device having a communication unit including a first function for forming a network, a second function for joining a network formed by a first other communication device, and a third function for communicating with a second other communication device that has joined the network formed by the first other communication device, through a direct connection based on the network formed by the first other communication device, when the communication device has joined, using the second function, the network formed by the first other communication device, the method comprising:
   controlling the third function so as to restrict a channel to be used in a direct connection using the third function, when the network has been formed by the first function.

9. A non-transitory computer-readable storage medium storing a computer program for causing a computer, which is provided in a communication device having a communication unit including a first function for forming a network, a second function for joining a network formed by a first other communication device, and a third function for communicating with a second other communication device that has joined the network formed by the first other communication device, through a direct connection based on the network formed by the first other communication device, when the communication device has joined, using the second function, the network formed by the first other communication device, to execute:
  controlling the third function so as to restrict a channel to be used in a direct connection using the third function, when the network has been formed by the first function.

* * * * *